(12) United States Patent
Maennel (10) Patent No.: US 9,147,161 B2
(45) Date of Patent: Sep. 29, 2015

(54) DETERMINING GEO-LOCATIONS OF USERS FROM USER ACTIVITIES

(71) Applicant: Google Inc., Mountain View, CA (US)

(72) Inventor: Hartmut Maennel, Zurich (CH)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/830,182

(22) Filed: Mar. 14, 2013

(65) Prior Publication Data

US 2015/0170030 A1 Jun. 18, 2015

(51) Int. Cl.
*G06N 5/02* (2006.01)

(52) U.S. Cl.
CPC .................................. *G06N 5/02* (2013.01)

(58) Field of Classification Search
CPC ................................ G06N 5/022; G06F 15/16
See application file for complete search history.

(56) References Cited

U.S. PATENT DOCUMENTS

| | | | |
|---|---|---|---|
| 6,665,715 B1 | 12/2003 | Houri | |
| 7,062,572 B1 | 6/2006 | Hampton | |
| 7,200,658 B2 | 4/2007 | Goeller et al. | |
| 7,296,088 B1 | 11/2007 | Padmanabhan et al. | |
| 7,424,472 B2 | 9/2008 | Wang et al. | |
| 7,937,336 B1 | 5/2011 | Maynard-Zhang et al. | |
| 8,275,656 B2 | 9/2012 | Cetin | |
| 8,407,226 B1 | 3/2013 | Das et al. | |
| 2003/0074471 A1* | 4/2003 | Anderson et al. | 709/245 |
| 2005/0108213 A1 | 5/2005 | Riise et al. | |
| 2009/0119394 A1 | 5/2009 | Winkler | |
| 2010/0114946 A1 | 5/2010 | Kumar et al. | |
| 2011/0282988 A1 | 11/2011 | Wang et al. | |
| 2012/0158712 A1 | 6/2012 | Karanjkar et al. | |
| 2012/0166416 A1 | 6/2012 | Murdock et al. | |
| 2012/0317104 A1 | 12/2012 | Radlinski et al. | |
| 2013/0007256 A1 | 1/2013 | Prieditis | |
| 2013/0159254 A1 | 6/2013 | Chen et al. | |

OTHER PUBLICATIONS

Teh, Yee W., David Newman, and Max Welling. "A collapsed variational Bayesian inference algorithm for latent Dirichlet allocation." In Advances in neural information processing systems, pp. 1353-1360. 2006.*
Hofmann, "Probabilistic Latent Semantic Analysis," Uncertainty in Artificial Intelligence, UAI'99, Stockholm, 1999, 8 pages.
Blei, et al., "Latent Dirichlet Allocation," J Machine Learning Res., 2003, 3:993-1022.
Teh et al., "Hierarchical Dirichlet Processes," Advances in Neural Information Processing Systems 17. Cambridge, MA: MIT Press, 2004, 8 pages.
Adams et al., "On the geo-indicativeness of non-georeferenced text," 2012, Proceedings of the Sixth International AAAI conference on Weblogs and Social Media, pp. 375-378.
Backstrom et al., "Spatial variation in search engine queries," 2008, Proceedings of the 17th international conference on World Wide Web, Apr. 2008, pp. 357-366.
Bennett et al., "Inferring and using location metadata to personalize web search," 2011, Proceedings of the 34th international ACM SIGI R conference on Research and development in Information Retrieval, Jul. 2011, pp. 135-144.

* cited by examiner

*Primary Examiner* — Jeffrey A Gaffin
*Assistant Examiner* — Ola Olude Afolabi
(74) *Attorney, Agent, or Firm* — Fish & Richardson P.C.

(57) ABSTRACT

Methods, systems, and apparatus, including computer programs encoded on computer storage media, for determining geographic locations. One of the methods includes obtaining a sequence of events, each of the events including geographical location information, from a first device to be located; determining, for each event and each of a plurality of geographical locations, a probability that the respective event was obtained from a second device given that the second device is located at the respective geographical location; determining a probability that the sequence of events was obtained from the second device, including using a model representing how sequences of events are generated by network devices; and determining for each of the plurality of geographical locations a probability that the first device is located at the respective geographical location using the probability that the sequence of events was obtained.

20 Claims, 6 Drawing Sheets

DETERMINING GEO-LOCATIONS OF USERS FROM USER ACTIVITIES

BACKGROUND

This specification relates to determining geographical locations of network devices. Network devices can be physically located at different geographical locations ("geo-locations") across the world.

Network devices can include routers, bridges, switches, and repeaters, as well as user devices which can be operated by a user. User devices, for example, personal computers and smart phones, that are coupled to a network, for example, the Internet, enable users of the devices to access resources stored on computers and storage devices that are also coupled to the network.

SUMMARY

This specification describes technologies relating to determining the geo-location of network devices from events obtained from the network devices. This determination is made using models, for instance by using models based on a Dirichlet process or a Pitman-Yor process, of the probability that the same event is obtained multiple times from a particular device or a particular group of devices.

In general, one innovative aspect of the subject matter described in this specification can be embodied in methods that include the actions of obtaining, by a system comprising one or more computers, a sequence of events, each of the events including geographical location information, from a first device to be located; determining, by operation of the system and for each event and each of a plurality of geographical locations, a probability that the respective event was obtained from a second device given that the second device is located at the respective geographical location; determining, by operation of the system, a probability that the sequence of events was obtained from the second device, including using a model representing how sequences of events are generated by network devices; and determining, by operation of the system and for each of the plurality of geographical locations, a probability that the first device is located at the respective geographical location using the probability that the sequence of events was obtained. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The model includes: a first probability that a previously obtained event is re-obtained, wherein the first probability equals $(m-d)/(k+\alpha)$, wherein k is a total number of events already obtained, m is the number of times the respective event has already been obtained, $\alpha$ is a predetermined non-zero constant and d is a predetermined constant; and a second probability that a not-previously-obtained event is obtained, wherein the second probability equals $(\alpha+t*d)/(k+\alpha)$, wherein t is a number of different events already obtained. The parameter $\alpha$ has a fixed value. The parameter $\alpha$ is determined from the sequence of events. The constant d is zero. The model represents the generation of the sequence of events by a Dirichlet process or by a Pitman-Yor process. The method further includes: identifying a first session of the first device, wherein a session is a period of time with a start time and an end time, wherein the model represents how sequences of events are generated by network devices in a single session. Identifying the first session includes determining that a predetermined amount of time has lapsed since the end of a previous session. The first device is one of a first group of devices, the method further includes: determining, for each of the plurality of geographical locations, a probability that a device of the first group of devices is located at the respective geographical location. The method further includes dividing the sequence of events into a plurality of groups of events, wherein each group of events is associated with a session of the first device, wherein the model represents how sequences of events are generated by network devices in a plurality of sessions. The model represents the generation of the sequence of events in a plurality of sessions by a hierarchical Dirichlet process or by a hierarchical Pitman-Yor process. Determining, for each of the plurality of geographical locations, a probability that the first device is located at the respective geographical location includes determining a minimum or a maximum of an expression for a probability that the sequence of events are obtained given that the first device is located at each of the plurality of geographical locations. The expression is a maximum-likelihood expression and determining a minimum or a maximum includes maximizing the maximum-likelihood expression by using an expectation-maximization method or a gradient-descent method. Determining, for each of the plurality of geographical locations, a probability that the first device is located at the respective geographical location includes using a Gibbs sampling method.

Particular implementations of the subject matter described in this specification can be implemented to realize one or more of the following advantages. The accuracy of estimated geographical location of network devices can be improved by incorporating user and session information. Additionally, the handling of equal events can also be improved A system can estimate geographical locations of network devices, e.g., user devices, from events obtained from the network devices using statistical models modeling the probability that a sequence of two or more related events is observed from a same user device in a group of user devices. For example, an estimate of a geographical location of a network device can be inferred from information obtained from an aggregated group of network devices, for example, on the order of 100 or 1000 devices, that is stable on a timescale of one day. A system can estimate a geographical location of presence that is accurate to the level of a city, a postal code, a neighborhood or an area, for example, a 2×2 sq. km area. Further, having a probability distribution of a network device's geographical location, a system can personalize the experience of a user of the network device accordingly, for example, by providing resources, e.g., recommendations, advertisements and search results, that are relevant to the geographical location.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
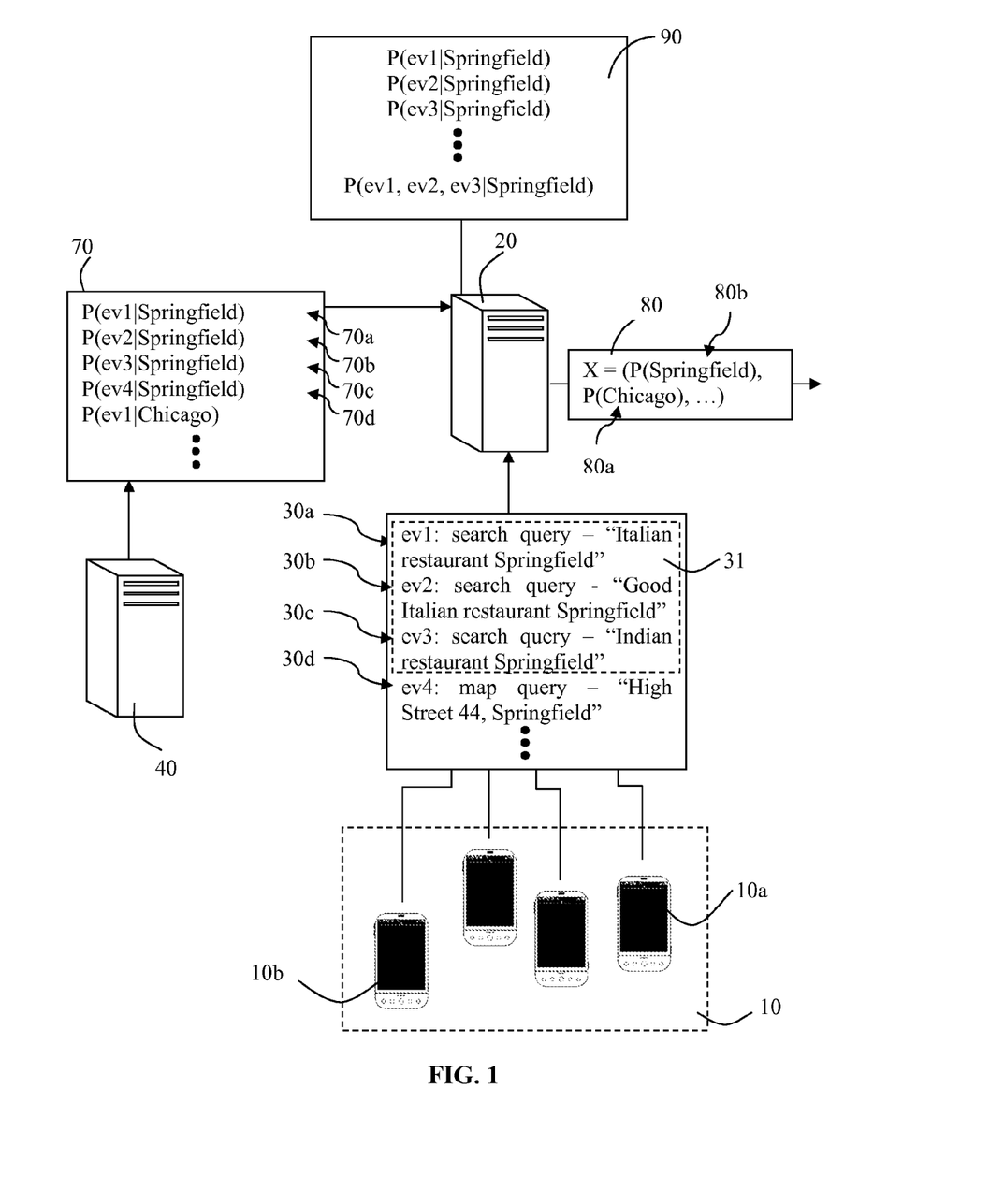
FIG. 1 illustrates multiple user devices and a computer system and a database that are coupled to a network.

FIG. 1 illustrates multiple user devices 10a, 10b, e.g., laptops, mobile phones, smartphones, tablet PCs, personal computers, or PDAs, and a computer system 20 and a database 40 that are coupled to a network. The multiple user devices 10a, 10b can be organized into or belong to a group of user devices 10. The techniques described below are described for user devices; however, they can also be implemented for other network devices, e.g., routers, bridges, switches, repeaters or hubs. The computer system 20 and database 40 can each be implemented on one or multiple computers in one or multiple locations, programmed and configured to perform the methods described below.

The system 20 obtains events 30a-30d that originated from the group of user devices 10.

Events are generally generated by a user device in response to a user action on the device; however, events may also be generated by the device itself. Events can be interactions of the user or the device with other devices or with resources or services on the network. Events can also be states or changes of state of the device itself that are transmitted to other devices on the network. Thus, an event can be, for example, a query received from a user device, including a search query, a map query, or a route query; a setting in a network application, e.g., a language setting, time zone or region setting, or a preference setting in a social network; a visit to one or more web pages by the user; one or several cookies stored on the device or transmitted by the device; or a posting in a social network.

Events are described in this specification as being observed, collected, received, or obtained by the system 20, by which is meant that data representing each of the events is observed, collected, received, or obtained by the system 20, and that the data includes content of the event. Of particular interest are events that include implicit or explicit information related to the geographical location of the device from which the events originated. In some implementations, an event is a search query containing the possible location X, e.g., New York City. Three search queries containing the possible location New York City would be three instances, ev1, ev2, ev3, of the same event.

In addition, the system 20 can associate times with the events. For example, every event can be associated with a time stamp indicating the time at which the particular event was observed, transmitted or generated.

Example systems and methods to obtain and store events from user devices are described in U.S. patent application Ser. No. 13/458,895, the contents of which are hereby incorporated by reference in their entirety. The user devices that are included in a group of devices 10 can be identified by the system 20 based on the network addresses, e.g., Internet Protocol addresses, of the user devices. In general, the system 20 can determine information regarding similarities in an estimated geographical location of a group of network devices from the network addresses of network devices. Methods that can be performed to cluster or group network devices based on their network addresses are described in U.S. patent application Ser. No. 13/458,895, the contents of which are hereby incorporated by reference in their entirety.

The system 20 can identify a single device 10a from the group of devices 10 from which one or more particular events were obtained. Alternatively or in addition, the system 20 can identify distinct users of the device 10a. For instance, the system 20 may be able to use cookies to distinguish among multiple users of the device.

For situations in which the system collects personal information about users, or may make use of personal information, the users may be provided with an opportunity to control whether programs or features collect personal information, e.g., information about a user's social network, social actions or activities, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized, so that no personally identifiable information can be determined for the user. Thus, the user may have control over how information is collected about him or her and used.

The system 20 can group the events originating from one user into one or more sessions, e.g., session 31, based on the times at which the events where generated or observed. For example, the system can identify the beginning of a new session if no event has been obtained from a particular device for a predetermined period of time, e.g., one hour. If the difference between time stamps associated with events subsequently obtained from the same user device is less than the predetermined period of time, the system 20 can determine that these events are associated with this new session. The session ends if no event is obtained for the predetermined period of time. In this manner, the system 20 can divide a portion or all of the obtained events into one or more sessions.

In general, the system 20 can estimate a geographical location of the single device 10a or 10b and/or the group of devices 10 based, at least partially, on the obtained events. A method for doing so that can be performed by the system 20 is described in reference to FIG. 5, below. The estimate of the geographical location of the device 10a or the group of devices 10 can be (i) a single geographical location, e.g., the geographical location having the greatest probability among multiple geographical locations, or (ii) a probability distribution representing the probability that the device 10a or the group of devices 10 are located at multiple geographical locations, e.g., a probability value for each geographical location.

The system 20 determines a probability distribution 80 of geographical locations including a probability 80a, 80b that a device of the group of devices is located at a particular geographical location for every one of a number of candidate geographical locations.

The system 20 can apply a weight to each event to be used in estimating the geo-location of the device 10a, 10b or the group of devices. For instance, a user might generate a sequence of slightly modified or refined queries to find a place of interest, e.g., a restaurant, in a particular area. While the first event of such a sequence of events can have a certain predictive power regarding the geographical location of the user or the user device, the subsequent events adds less predictive power than an event independent from the first event. In particular, several events can originate from the same user. Adding many events from one user may not provide as much information as few events from each of many users. Additionally, query events can be repeated. Repeating the same query reinforces the information, but not as much as different types of queries about the same or a neighboring location. Therefore, different search queries containing the same location name are treated as a same event. The system 20 can take this into account when estimating the geographical location of the device 10a or the group of devices 10 by using a statistical model 90 modeling the probability that a sequence of two or more events is observed from the user device 10a or the group of user devices 10. The system 20 applies the statistical model 90 to compute a conditional probability that an obtained sequence of events is observed from the group of devices 10 given that the group of devices 10 is located at a respective geographical location. Alternative or additional implementations of the statistical model 90 are described below in reference to FIGS. 2 and 4. For example, the statistical model 90 can be model based on a Dirichlet process or a Pitman-Yor process. Moreover, the statistical model 90 can also be a hierarchical Dirichlet process or Pitman-Yor process based model. In the example of a hierarchical Dirichlet process probabilities of a sequence of sequences of events, e.g. p({{ev1,ev2}, {ev3}, {ev4,ev5,ev6}}) are used.

Even though the statistical models described above and in reference to FIGS. 2 and 4 are models modeling the probability that a sequence of two or more events is observed from a user device or a group of user devices, these techniques can be directly employed to model the probability that a sequence of two or more events is observed in a single session of a user device. In this situation, instead of associating a sequence of events with a single user device or user, the system 20 can 1) associate a sequence of events with a single session, 2) use one of the statistical models described in reference to FIGS. 2 and 4 to determine a probability that the sequence of events is obtained given that the device or the group of devices is located at a respective geographical location, and 3) determine an estimate of the geographical location of a user device or group of user devices hosting the session based on this probability.

In some implementations, the system 20 uses a statistical model modeling the probability that a sequence of two or more events is observed from a user or a user device during a session. based on the times at which the events where generated or observed. The session can be based on whether subsequent events obtained from the same user occur within a predetermined period of time. Alternatively, the session can be the sequence of events observed during a predetermined time span. The predetermined time span can be selected according as required in the respective geo-location system, e.g., one hour or one day. If a sequence of events obtained in one session is considered, the length of the session can determine the duration of the predetermined time span.

The statistical model includes a probability that, a previously obtained event is re-obtained is proportional to or equal to $k/(k+\alpha)$, wherein k is a total number of events already obtained in the session and $\alpha$ is a predetermined positive constant. Accordingly, the model includes a second probability that an event not yet previously obtained in the session is obtained is proportional to or equals $\alpha/(k+\alpha)$.

By using the statistical model including these probabilities, the system 20 can compute a probability that an obtained sequence of events is obtained, given that the user device or group of user devices is located at one or one of multiple geographical locations. This probability can then be used by the system 20 to estimate a geographical location of a user or a user device. The models modeling the probability that a sequence of two or more events is observed from a user device or a group of user devices described in the previous example have the advantage, over some techniques, that the determined probabilities for the generation of a predetermined sequence of events are not dependent from an order in which the events are obtained. For example, the events can be collected during a predetermined time span at system 20 or another system. Periodically or triggered by a user action, the system 20 can estimate the geographical location of the user device 10a or the group of user devices 10 based on all events previously collected without having to consider the time order in which they were collected.

The approach of modeling the probability that a sequence of two or more events is observed from a user device or a group of user devices introduced above has been mathematically described in connection with Dirichlet processes. In general, a Dirichlet process, $Dir(G_0, \alpha)$, is determined by a probability distribution $G_0$ on a set T and a real, positive number $\alpha$. The Dirichlet process is a probability distribution on probability distributions on the set T. $G_0$ assigns a probability to subsets of T, $Dir(G_0, \alpha)$ assigns a probability to subsets of the set of all probability measures on T. The set T can be a set of different events a user or a user device may generate, to model the generation of events by a user or user device. As a result, the obtained sequence of events can be modeled to be distributed according to $Dir(G_0, \alpha)$, which can describe the possible distributions of events over the set T, i.e., how many times each different event is included in a sequence of events.

To do this, a probability distribution $G_i$ can be randomly selected according to $Dir(G_0, \alpha)$. In a next step, the actual obtained sequence of events can be selected according to the randomly selected probability distribution $G_i$. Therefore, the system 20 can use a model based on a Dirichlet process to model the probability that a sequence of two or more events is observed from a user device or a group of user devices.

For a sequence of N events obtained from a user or a user device that contains t different events, where the number of times the i-th event $ev_i$ is included in the particular sequence of events is $k_i$, the system 20, using a Dirichlet process based model, determines a probability of the sequence to be:

$$(k_1 \times ev_1, k_2 \times ev_2 \ldots k_t \times ev_t) = \frac{1}{(\alpha)_N} \prod_{i=1}^{t} (\alpha \times G_0(ev_i))_{k_i} \quad (1)$$

As used in this formula and elsewhere, the Pochhammer symbol $(x)_k$ is defined by:

$$(x)_k = x \times (x+1) \times \ldots \times (x+k-1)$$

This probability can be used by the system 20 to infer the geographical location of a user or user device. An example implementation is described in reference to FIGS. 3 and 4 below.

The statistical model 90 can be represented as a Bayesian network. In general, Bayesian networks are directed acyclic graphs whose nodes represent random variables and whose edges represent conditional dependencies. Each node is associated with a probability function that receives a particular set of values of the variables of the node as an input.

The Bayesian network representation for the model of the event generation process by users or user devices can be used in the system 20 to infer the geographical location of users or user devices, as described below. The Bayesian network model 90 can be stored on the system 20, or on another system (not shown) in any conventional form.

Figure 2:
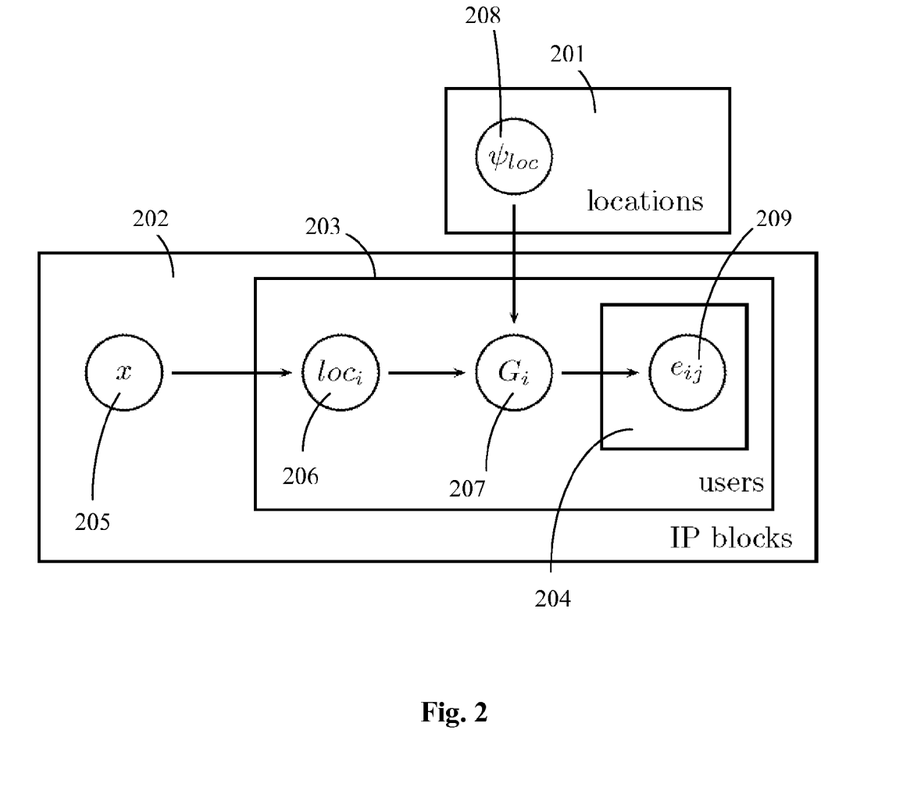
FIG. 2 illustrates a Bayesian network representation of a Dirichlet process based model of the generation process of events by network devices.

FIG. 2 illustrates a Bayesian network representation of a Dirichlet process based model of the generation process of events by network devices. The Bayesian network contains five nodes 205-209.

The unknown probability distribution of geographical locations of a user device or a group of user devices is denoted as X (represented in the node 205). The probability distribution of geographical locations X contains, for all candidate geographical locations, a probability that a device is located at the respective geographical location. The set of candidate geographical locations 201 can be predetermined or it can be derived from the obtained events. Methods a system can perform to determine a set of candidate geographical locations are described in U.S. patent application Ser. No. 13/458,895, the contents of which are hereby incorporated by reference in their entirety.

The unknown geographical location in which an i-th user or user device from a set of users 203, e.g., user device 10a, of a group of user devices 10 is located is denoted $loc_i$ (represented in the node 206). As described above, a group of user devices can be determined based on the network addresses of the user devices. In the example of FIG. 2, the group of user devices belongs to a same block of Internet Protocol addresses 202. In the Bayesian network representation of FIG. 2, the location $loc_i$ is selected according to the probabilities included in X.

A known event distribution for the candidate location $loc_i$ is denoted as $\psi_{loc_i}$. For example, the event distribution can contain, for a set of events and candidate geographical locations, a set of conditional probabilities p(ev|loc) that a respective event is obtained given that a user or user device is located at a respective geographical location. As depicted in FIG. 1, these conditional probabilities 70 can be retrieved from a database 40 that stores the conditional probabilities. In this example, for each candidate geographical location, a separate probability value 70a-d is obtained indicating a probability that a particular event is observed given that a device is located at a respective geographical location. Alternatively, the conditional probabilities 70 can also be stored on the system 20. The known event distribution can be determined in any of various ways. For example, reference user devices can be used to determine the event distribution. Further methods to derive the conditional probabilities 70 forming the event distribution are described in U.S. patent application Ser. No. 13/458,895, the contents of which are hereby incorporated by reference in their entirety.

Additionally, in the model the distribution $G_i$ (represented at note 207) is assumed to exist, but is not observed. Thus, in the model $G_i$ is not a probability distribution on obtained events, but on the set of all events. $G_i$ is randomly selected from $Dir(\psi_{loc_i}, \alpha)$, where $\alpha$ is a predetermined positive constant, as described above. In alternative implementations, $\alpha$ can be chosen for each user independently. In the model, the value of $\alpha > 0$ is arbitrary, but when applied to the observed events data, the value of $\alpha$ is chosen so that it is the value that best explains the observed data.

The events observed from an i-th user or user device are denoted as $ev_{ij}$ (represented by the node 209), with the subscript j indicating a j-th member of a sequence of events obtained from the i-th user or user device. As the sequence of events is obtained at or received by the system 20, the events are known and thus constitute a set of known variables of the statistical model 90.

In order to estimate the probability distribution of geographical locations X, the system 20 can solve the Bayesian network model 90, i.e., estimate the unknown probability distribution of geographical locations X based on the known events $ev_{ij}$ and the known event distribution $\psi_{loc_i}$.

The system 20 can be programmed to do so using a variety of different methods. For example, the system 20 can use a Bayesian estimator, e.g., a maximum a posteriori ("MAP") estimator, that minimizes a posterior expected value of a loss function, i.e., that maximizes the posterior expectation of a utility function.

In other implementations, the system 20 can use a maximum likelihood estimator that yields the most likely probability distribution of geographical locations of the user or user devices given the obtained events and a known event distribution for the candidate locations. One implementation of a maximum-likelihood estimator, which is solved by an expectation-maximization method, is described in reference to FIG. 3.

As an alternative to the Bayesian estimator and the maximum likelihood estimator, the system 20 can also perform a Gibbs sampling to solve the Bayesian network model 90 to infer the probability distribution of geographical locations.

To use the models described above, the system 20 has to determine if two obtained events are the "same" event. Although two obtained events can be identical events, e.g., literally identical search queries, two obtained non-identical events can be determined to be the "same" event based on other factors. For example, two obtained events can be determined to be the same event based on the obtained events' predictive power for estimating the geographical location of a user or a user device. In other words, the system 20 classifies the obtained events according to the geographical location information they contain. If two events contain the same geographical location information, system 20 determines that the two events are in the same class of events, i.e., are the "same" event.

For example, as described above, sequences of events obtained from user devices frequently include related events. This can occur if, for example, a user enters the same query multiple times with only slight modifications. These related queries can carry the same geographical location information and therefore be classified in the same class of events.

The criteria for determining if two events include the same geographical location information can be predetermined. For example, an event can be divided into data that describes geographical location information and data that does not describe geographical location information. Then, the system 20 can identify that two events belong to the same class of events, i.e. are the "same" event, if the data that describes geographical location information is identical in both events. For instance, names of places can constitute geographical location information. Therefore, two events can be identified by the system 20 as belonging to the same class of events if both events include the same names of places.

Figure 3:
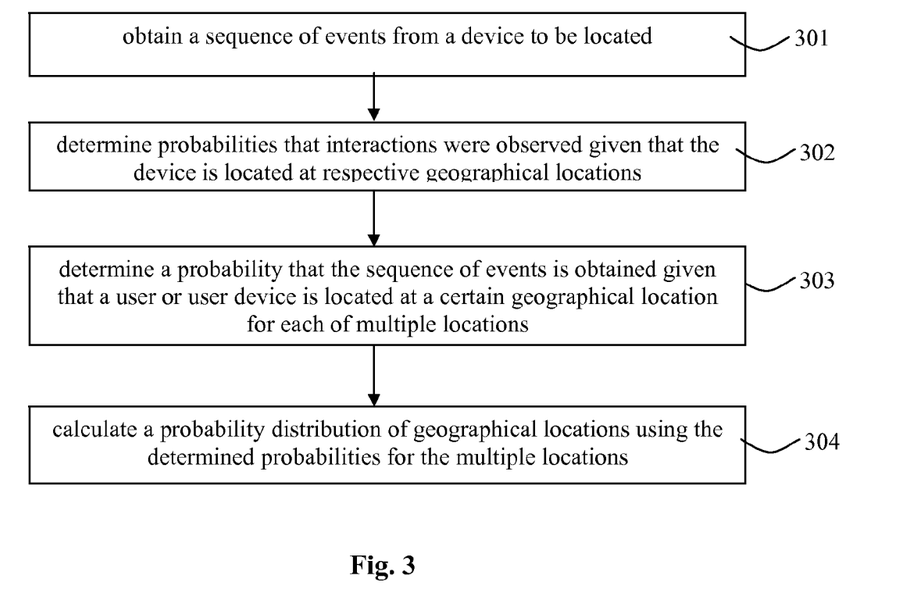
FIG. 3 is a flow diagram of an example process for determining a geographic probability distribution.

FIG. 3 is a flow diagram of an example process for determining a geographic probability distribution. The process uses a Dirichlet process based model, as described above. The process can be performed by a system as described in reference to FIG. 1, e.g., the system 20.

The system 20 can determine a probability value for each of a number M of candidate geographical locations in which the group of user devices can be located. The candidate geographical locations form a set L of geographical locations having M members; the i-th member is denoted as $loc_i$. The candidate geographical locations can be determined as described above.

The process begins by obtaining (301) N events that have been observed from the group of devices whose geographical location are to be determined. For example, the system 20 can obtain N events from the group of devices 10. Therefore, the obtained events form a set of events E that has N members, where the j-th member is denoted with $ev_j$. Both N and M are natural numbers.

The system determines (302) probabilities that an i-th event $ev_i$ is observed from a device given that the device is located at the j-th geographical location $loc_j$. For example, given that a device is located at San Francisco, a probability that a search query including "San Francisco" is observed can be 0.4. The probability that an event $ev_i$ is observed from a device given that the device is located at the j-th geographical location $loc_j$ can be expressed by a conditional probability of the form $P(ev_i|loc_j)$.

Step 302 can be repeated for all obtained events and all candidate geographical locations. In such manner, a set of conditional probabilities can be generated. The conditional probabilities can be previously known and stored in a database, such as a historical data base described in U.S. patent application Ser. No. 13/458,895. The system 20 can access the database and request the conditional probabilities for each obtained event from this database.

The system then determines (303) the probability that the obtained sequence of events $e_{i*}$ has been obtained, where the "*" symbol denotes that the sequence includes all different events, i.e., runs from 1 to t, given that a user or user device is located at a certain geographical location $p(ev_{i*}|loc)$ for multiple locations. This can include using an expression derived from a Dirichlet process based model as described above. For instance, the conditional probability $p(ev_{i*}|loc)$ can be computed to be:

$$p(k_1 \times ev_1, k_2 \times ev_2 \ldots k_t \times ev_t | loc) = \frac{1}{(\alpha)_N} \prod_{i=1}^{t} (\alpha \times p(ev_i | loc))_{k_i}$$

The system 20 calculates (304) a probability distribution of geographical locations of the group of devices X(loc) from the conditional probabilities $p(ev_{j*}|loc)$ determined for the obtained sequence of events. In this manner, the Dirichlet process based model for the generation of events described above is taken into account when estimating the geo-location of the group of user devices 10.

The calculation described in the previous paragraph can include evaluating an expression for the likelihood that the observed set of events is obtained from a device or a group of devices distributed according to a probability distribution of geographical locations. This likelihood is unknown but it can be expressed by the conditional probabilities $p(ev_{j*}|loc)$ determined in a previous step and the probability distribution of geographical locations to be determined. The system 20 can determine the probability distribution of geographical locations to be determined from this expression.

For instance, the system 20 can determine a probability distribution of geographical locations maximizing this unknown likelihood expression. This maximization can be performed without actually determining the unknown likelihood that the observed set of events was obtained from a device or a group of devices distributed according to the probability distribution of geographical locations.

In some implementations, the likelihood that the observed sequence of events was obtained from a device or a group of devices distributed according to the probability distribution of geographical locations D(E|X), can be expressed as:

$$\log D(E|X) = \log \prod_{ev \in E} D(ev|X)$$
$$= \sum_{ev \in E} \log D(ev|X)$$
$$= \sum_{ev \in E} \log \sum_{loc \in L} X(loc) P(ev_{i*}|loc)$$

The system 20 determines the probability distribution of geographical locations X that maximizes this expression. The system can determine the probability distribution of geographical locations X that maximizes foregoing likelihood using statistical methods, for example, an expectation-maximization algorithm, as described below in reference to FIG. 4, steps 404-406. Alternatively, a gradient descent algorithm can also be used to determine a probability distribution of geographical location X(loc) that maximizes this expression.

Figure 4:
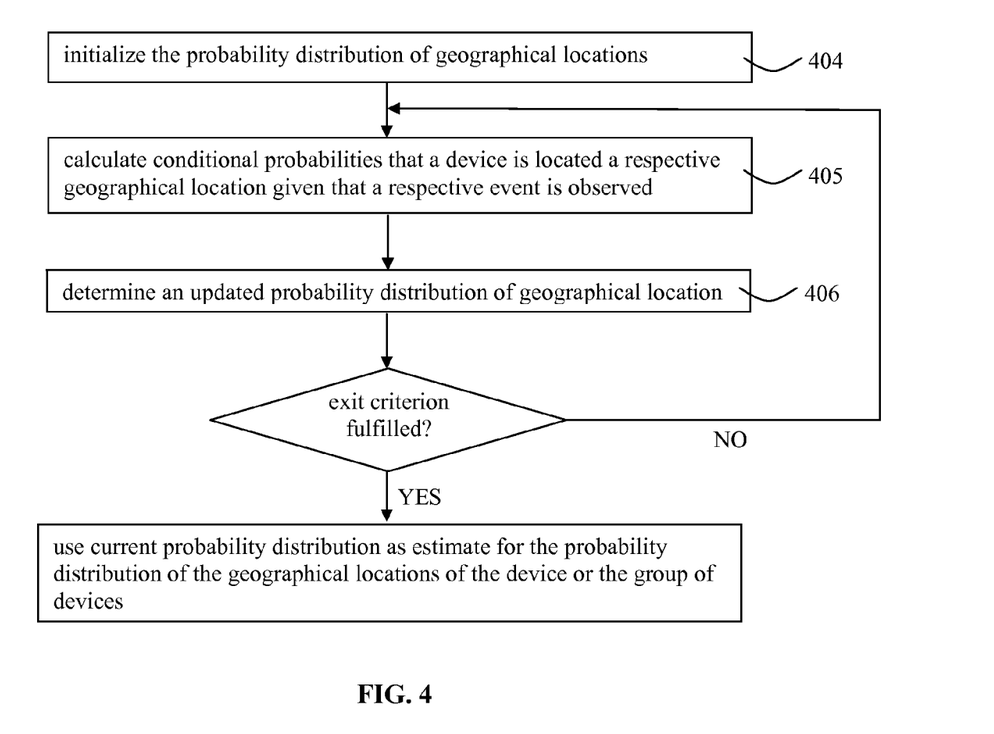
FIG. 4 is a flow diagram of an example expectation-maximization process to maximize a maximum-likelihood expression.

FIG. 4 is a flow diagram of an example expectation-maximization process to maximize a maximum-likelihood expression.

The system 20 initializes (404) the probability distribution of geographical locations X(loc). This initialization can include assigning an equal probability value to all candidate geographical locations. Alternatively, a probability value of one can be assigned to a most likely geographical location that was previously determined. Further techniques to initialize the probability distribution are described in U.S. patent application Ser. No. 13/458,895.

Then, the system 20 performs an iterative procedure which first includes an expectation step, yielding an update for the conditional probabilities $q(loc|ev_{i*})$, which indicate the probability that a device is located a respective geographical location given that a respective event is observed. The expectation step can include calculating (405) these conditional probabilities $q(loc|ev_{i*})$ according to:

$$q(loc|ev_{i*}) = \frac{P(ev_{i*}|loc) X^t(loc)}{\sum_{loc' \in L} P(ev_{i*}|loc') X^t(loc')}$$

In a subsequent maximization step, the system can use these updated conditional probabilities $q(loc|ev_{i*})$ to determine (406) an updated probability distribution of geographical location $X^{t+1}(loc)$ at an iteration step t+1 as follows:

$$X^{t+1}(loc) = \sum_i q(loc|ev_{i*})$$

In the subsequent expectation step, the system uses the updated probability distribution of geographical location $X^{t+1}(loc)$ to determine an updated set of conditional probabilities $q(loc|ev_{i*})$, which then are used to calculate the next probability distribution of geographical location $X^{t+2}(loc)$ at a next iteration step t+2 and so on.

This iteration can be continued until an exit criterion is fulfilled. For instance, the probability distribution of geographical location can converge towards a probability distribution. This can include determining if the change in a last step is lower than a predetermined threshold, or that the change in the last m steps was lower than a predetermined threshold. Other exit criteria can include a maximum number of iterations.

If the exit criterion is fulfilled, the system 20 can output the current probability distribution as an estimate of the probability distribution of geographical locations of the group of devices.

Methods have been described above in reference to FIGS. 1 to 3 that estimate a probability distribution of geographical locations of a user device. As described above, the same methods can be used to determine the geographical location of a device when the events of a single session have been obtained.

Instead of implementing the statistical model 90 by using Dirichlet process based model modeling the probability that a sequence of two or more events is observed from a user device or a group of user devices, the statistical model 90 can also be implemented as a Pitman-Yor process based model. The Pitman-Yor process based model is a generalization of the Dirichlet process based model. A Pitman-Yor based model contains an additional parameter, which can be set to tune the growth speed of the number of different events. In particular, the number of different events grows logarithmically in a Dirichlet process based model. In a Pitman-Yor based model, the number of different events grows in the order of $n^d$, wherein d is the additional parameter.

If the statistical model 90 is implemented as a Pitman-Yor process based model, a probability that, at a predetermined point in time, a previously obtained event is re-obtained equals $(c_i-d)/(k+\alpha)$, wherein k is a total number of events already obtained at the predetermined point in time, $\alpha$ and d are predetermined non-zero constants and $c_i$ is the multiplicity of the i-th event, i.e., the number of times the event has already been obtained in a predetermined time span. Accordingly, a second probability that, at the predetermined point in time, an event not previously obtained in the predetermined time span is obtained equals $(\alpha+td)/(k+\alpha)$, where t denotes the number of different events obtained at a certain point in time. The predetermined time span can be selected according as required in the respective geo-location system, e.g., one hour or one day. If a sequence of events obtained in one session is considered, the length of the session can determine the duration of the predetermined time span The Pitman-Yor based model can be represented by a Bayesian network model as described in reference to FIG. 2. The only modification consist in the distribution of distributions $G_i$ (represented by node 207). $G_i$ encodes the probabilities of different events for a user or a user device i. $G_i$ is randomly drawn from $PY(\psi_{loci}, \alpha, d)$ instead of from Dir $(\psi_{loci}, \alpha)$.

The Pitman-Yor based model can be solved by the methods described above. In particular, the system 20 can infer a maximum likelihood estimate by using an expectation-maximization algorithm, as described above in reference to FIGS. 3 and 4. However, instead of using the conditional probabilities for the generation of the sequence of obtained events derived from the Dirichlet process based model, conditional probabilities derived from the Pitman-Yor process based model are used.

In reference to FIGS. 1 to 3, processes have been described by which the system 20 can estimate the geo-location of a group of devices 10 including modeling the generation process of a sequence obtained events from a single user device or in a single session. These processes can also be expanded to a situation where events from multiple sessions are included in the sequence of obtained events.

Figure 5:
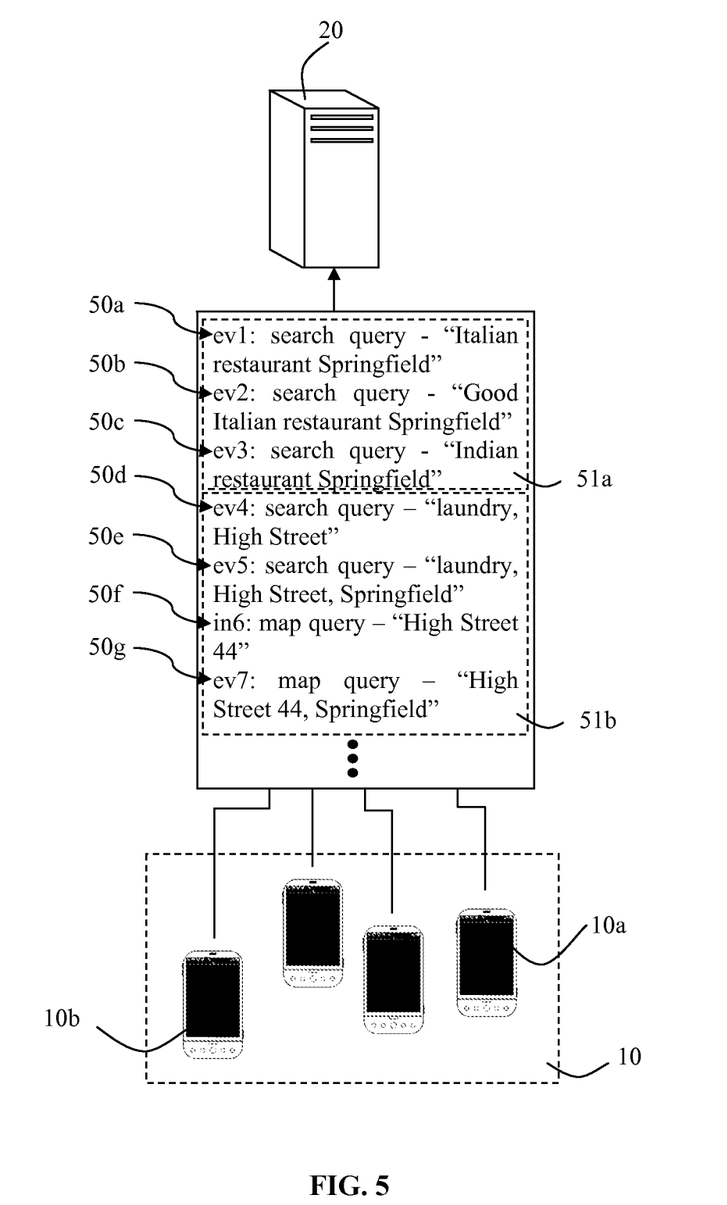
FIG. 5 illustrates the user network devices and the computer system described in reference to FIG. 1.

FIG. 5 illustrates the user network devices 10a, 10b and the computer system 20 described in reference to FIG. 1. The system 20 receives or obtains events 50a-50g that are associated with different sessions 51a, 51b from each user device 10a, 10b. For example, a single user or user device 10a may generate events in multiple sessions. In the example of FIG. 5, a first sequence of events 50a to 50d is generated and grouped by the system 20 in a first session 51a. A second sequence of events is generated by the user device 10a and grouped by the system 20 into a second session 51b. All events 50a to 50g are obtained at system 20.

Methods to divide a sequence of obtained events into different sessions, i.e., to determine in which session a particular event belongs, are described above in reference to FIG. 1.

In order to take into account both sessions and users and/or user devices, the models described above can be modified. This can further improve the accuracy of the geographical location estimates as the user behavior can differ from session to session. For example, a user might search for a restaurant in a first session and for a particular product in a second session, which occurs at a later time. In other words, the user's search query topics, e.g., the user's interests, change from the first session to the second session. The user's changing interests can be accounted for in the modified model, e.g., in a hierarchical Dirichlet process based model or a hierarchical Pitman-Yor process based model.

In one example, the model used by system 20 can be a hierarchical Dirichlet process based model. In other examples, as described below, a hierarchical Pitman-Yor process based model can be used to take into account both sessions and users and/or user devices.

Figure 6:
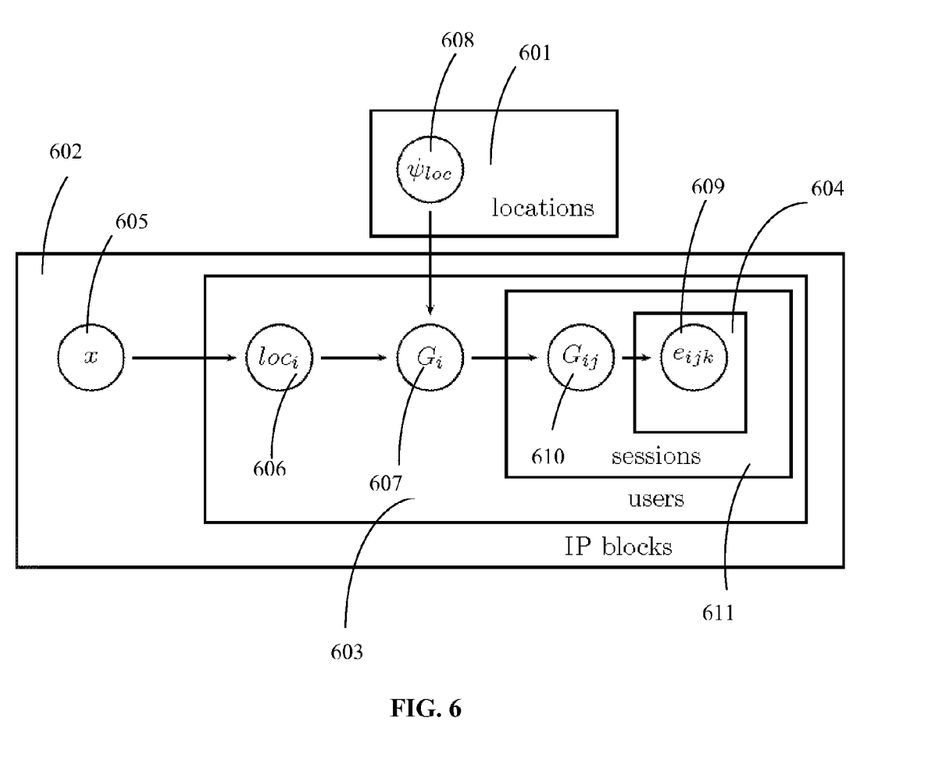
FIG. 6 illustrates an example Bayesian network representation for a hierarchical Dirichlet process based model of the generation of events in multiple sessions Like reference numbers and designations in the various drawings indicate like elements.

The hierarchical Dirichlet process based model of the generation of the sequence of events can use a separate model for each session. In addition, each model can be independent of the models for other sessions FIG. 6 depicts a Bayesian network representation for a hierarchical Dirichlet process based model of the generation of events in multiple sessions. The background of the Bayesian network representation is described in reference to FIG. 2 above.

As shown in FIG. 6, the Bayesian network of the hierarchical Dirichlet model has similarities with the Bayesian model depicted in FIG. 2. Accordingly, reference signs 601 to 609 indicate the features of the Bayesian network of the Pitman-Yor process based model corresponding to the features referenced by reference signs 201 to 209 in the Bayesian network of the Dirichlet process based model in FIG. 2.

However, an additional layer 611 has been added to take multiple sessions into account. In the Bayesian network of FIG. 6, the events $e_{ijk}$ are not directly generated according to the distribution $G_i$, as in FIG. 2. Rather, a second probability distribution $G_{ij}$ (610) is generated according to $Dir(G_i, \beta)$, wherein $\beta$ is a predetermined constant of a second Dirichlet process. The parameter $\beta$ is analogous to the parameter $\alpha$ of the first Dirichlet process. In this manner, the two Dirichlet processes are nested and thus form a hierarchical Dirichlet process based model.

In order to solve the Bayesian network of FIG. 4, the system 20 can use the methods described above in reference to FIG. 2. For instance, the sequence of events obtained from a certain user device or user, e.g., the i-th user of a group of users, can be partitioned into s different sessions indexed by j, so that the index j runs from 1 to s.

In addition, the different events included in the sequence of events obtained from the user or user device are indexed by an index k, where the index k runs from 1 to t. Techniques to determine which events of the sequence of events are classified as the same events and which are classified as different events are described above in reference to FIG. 1.

Therefore, the sequence of events obtained from the user or user device form a set. The number of times a k-th event is obtained during a j-th session of an i-th user or user device is denoted by $n_{jk}$.

The probability that a sequence of events is obtained from a user or user device given that the device is located at the i-th location can be derived from the hierarchical Dirichlet process based model described above as:

$$p(n_{**} \mid loc_i) = \sum_{m=0}^{deg(Q)} \frac{q_m}{(\alpha)_m \prod_{j=1}^{s} (\beta)_{n_j}} \qquad (2)$$

where $n_j = \sum_{k=1}^{s} n_{jk}$ is the total number of events in the j-th session, and the numbers $q_m$ and $deg(Q)$ are specified below. The index m denotes an unknown number of draws from $G_i$ involved for generating the sequence of events obtained from the user or user device. Consequentially, m ranges from the number of different events in the sequence t, one draw for every different event, to the total number of events in the sequence N.

The above probability formula can be derived as follows. A probability $p(n_{}, m \mid loc_i)$ can be computed for every m, i.e., a probability that the observed sequence of events is obtained with m draws from $G_i$ given that the user or user device is located at the i-th geographical location. Then, the sought probability $p(n_{} \mid loc_i)$ can be calculated as a sum of the probabilities $p(n_{}, m \mid loc_i)$ over the index m, as can be seen in the above formula for $p(n_{} \mid loc_i)$.

The expression for $p(n_{} \mid loc_i)$ can be derived by induction by considering one event at a time. The probability to obtain a restricted set of events $ev_1, \ldots, ev_k$ of events from a user or user device is denoted by $p(n_{\leq k}, m \mid loc_i)$.

A recursive approach can be employed including forming, for each event index $k=1, 2, \ldots, t$, the following polynomial:

$$A_k(X) := \prod_{j=1}^{s} (X) n_{jk}$$

Then, a second polynomial $Q_k(X)$ can be obtained from $A_k(X)$ by multiplying the coefficients of each X by $(P_k \cdot a)_m \cdot b_m$ $$Q(X) := \prod_{k=1}^{t} Q_k(X) =: \sum_{m=0}^{deg(Q)} q_m X^m$$

This expression can be used to derive the formula for $p(n_{**} \mid loc_i)$ recited above. In order to determine the probability that a sequence of events is obtained from a user or user device in multiple sessions, this probability can be used in the processes described in reference to FIGS. 1 to 3 to compute a probability distribution of geographical locations X(loc) for the group of devices including the user device.

Pitman-Yor process based models can also be used to generate a hierarchical Pitman-Yor process based model to model the generation of events by users or user devices in multiple sessions. Again, the hierarchical Dirichlet process based models and their implementations can be used by system 20, with the sole modification that, wherever in a draw according to a Dirichlet distribution is part of the model in the hierarchical Dirichlet process based models, a draw from a corresponding Pitman-Yor distribution is used. In order to infer a geographical location distribution estimate for a user device or a group of user devices, the techniques described above in reference to FIG. 6 can be used.

The above models are based on exchangeability, the assumption that any permutation of the users, sessions for a user, and events in a session will give the same probabilities. In certain special cases, the last assumption may actually not be justified: for example, a user of a map application may change driving directions by dragging an intermediate point on a displayed route. This will generate a number of consecutive requests with the same start and end point, and the events in this group are not exchangeable with other events outside the group. To get the "right" estimates from the above models one would have to treat these special cases separately, e.g., by replacing consecutive "driving directions events" with same start and end point occurring within a short time with just two events corresponding to start and end point.

Depending on what these special cases are, the models can be modified to take them into account; as long as the probability of an observed sequence of events given the location can be computed as in equations (1) or (2), above, the models and the computation, e.g., the EM algorithm, can be modified accordingly.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, for example, multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's network device in response to requests received from the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network, for example, the Internet, and peer-to-peer networks, for example, ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, for example, an HTML page, to a client device, for example, for purposes of displaying data to and receiving user input from a user interacting with the client device. Data generated at the client device, for example, a result of the user interaction, can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining, by a system comprising one or more computers, a sequence of query events from a device, wherein the device is located in one of a plurality of geographical locations;
   obtaining, by operation of the system, a plurality of probabilities $p(ev|loc)$ for each event and each of the plurality of geographical locations, wherein each probability $p(ev_i|loc_j)$ represents a probability that a particular event $ev_i$ is observed from the device given that the device is located at a particular geographical location $loc_j$;
   determining, by operation of the system, a probability that the sequence of query events was obtained from the device given that the device is located at a particular geographical location of the plurality of geographical locations, wherein determining the probability includes using a model representing how sequences of events are generated by network devices and the obtained plurality of probabilities $p(ev|loc)$; and
   determining, by operation of the system, a probability distribution for the device, wherein the probability distribution for the device represents a probability that the device is located at each of the plurality of geographical locations using the determined probability that the sequence of query events was obtained.

2. The method of claim 1, wherein the model includes:
   a first probability that a previously obtained event is re-obtained, wherein the first probability equals $(m-d)/(k+\alpha)$, wherein k is a total number of events already obtained, m is the number of times the respective event has already been obtained, $\alpha$ is a predetermined non-zero constant and d is a predetermined constant; and
   a second probability that a not-previously-obtained event is obtained, wherein the second probability equals $(\alpha+t*d)/(k+\alpha)$, wherein t is a number of different events already obtained.

3. The method of claim 2, wherein the parameter $\alpha$ has a fixed value.

4. The method of claim 2, wherein the parameter $\alpha$ is determined from the sequence of events.

5. The method of claim 2, wherein the constant d is zero.

6. The method of claim 1, wherein the model represents the generation of the sequence of events by a Dirichlet process or by a Pitman-Yor process.

7. The method of claim 6, further comprising:
   identifying a first session of the device, wherein a session is a period of time with a start time and an end time, wherein the model represents how sequences of events are generated by network devices in a single session.

8. The method of claim 7, wherein identifying the first session includes determining that a predetermined amount of time has lapsed since the end of a previous session.

9. The method of claim 1, wherein the device is one of a group of devices, the method further comprising:
   determining, for each of the plurality of geographical locations, a corresponding probability distribution for each other device of the group of devices.

10. The method of claim 1, further comprising:
    dividing the sequence of query events into a plurality of groups of events, wherein each group of events is associated with a session of the device,
    wherein the model represents how sequences of events are generated by network devices in a plurality of sessions.

11. The method of claim 10, wherein the model represents the generation of the sequence of query events in a plurality of sessions by a hierarchical Dirichlet process or by a hierarchical Pitman-Yor process.

12. The method of claim 1, wherein determining, for each of the plurality of geographical locations, a probability that the device is located at the respective geographical location includes determining a minimum or a maximum of an expression for a probability that the sequence of query events are obtained given that the device is located at each of the plurality of geographical locations.

13. The method of claim 12, wherein the expression is a maximum-likelihood expression and determining a minimum or a maximum includes maximizing the maximum-likelihood expression by using an expectation-maximization method or a gradient-descent method.

14. The method of claim 1, wherein determining, for each of the plurality of geographical locations, a probability that the device is located at the respective geographical location includes using a Gibbs sampling method.

15. A computer storage medium encoded with instructions that, when executed by one or more computers, cause the one or more computers to perform operations comprising:
    obtaining a sequence of query events from a device, wherein the device is located in one of a plurality of geographical locations;
    obtaining, by operation of the system, a plurality of probabilities $p(ev|loc)$ for each event and each of the plurality of geographical locations, wherein each probability $p(ev_i|loc_j)$ represents a probability that a particular event $ev_i$ is observed from the device given that the device is located at a particular geographical location $loc_j$;
    determining a probability that the sequence of events was obtained from the device given that the device is located at a particular geographical location of the plurality of geographical locations, wherein determining the probability includes using a model representing how sequences of query events are generated by network devices and the obtained plurality of probabilities $p(ev|loc)$; and
    determining a probability distribution for the device, wherein the probability distribution for the device represents a probability that the device is located at each of the plurality of geographical locations using the determined probability that the sequence of query events was obtained.

16. A system comprising:
    one or more computers and one or more storage devices storing instructions that are operable, when executed by the system, to cause the system to perform operations comprising:

obtaining, by the system, a sequence of query events from a device, wherein the device is located in one of a plurality of geographical locations;

obtaining, by operation of the system, a plurality of probabilities p(ev|loc) for each event and each of the plurality of geographical locations, wherein each probability $p(ev_i|loc_j)$ represents a probability that a particular event $ev_i$ is observed from the device given that the device is located at a particular geographical location $loc_j$;

determining, by operation of the system, a probability that the sequence of events was obtained from the device given that the device is located at a particular geographical location of the plurality of geographical locations, wherein determining the probability includes using a model representing how sequences of query events are generated by network devices and the obtained plurality of probabilities p(ev|loc); and determining, by operation of the system, a probability distribution for the device, wherein the probability distribution for the device represents a probability that the device is located at each of the plurality of geographical locations using the determined probability that the sequence of query events was obtained.

17. The system of claim 16, wherein the model includes:
a first probability that a previously obtained event is re-obtained, wherein the first probability equals $(m-d)/(k+\alpha)$, wherein k is a total number of events already obtained, m is the number of times the respective event has already been obtained, $\alpha$ is a predetermined non-zero constant and d is a predetermined constant; and a second probability that a not-previously-obtained event is obtained, wherein the second probability equals $(\alpha+t*d)/(k+\alpha)$, wherein t is a number of different events already obtained.

18. The system of claim 16, wherein the device is one of a group of devices, the operations further comprising:
determining, for each of the plurality of geographical locations, a corresponding probability distribution for each other device of the group of devices.

19. The system of claim 16, the operations further comprising:
dividing the sequence of query events into a plurality of groups of events, wherein each group of events is associated with a session of the device,
wherein the model represents how sequences of events are generated by network devices in a plurality of sessions.

20. The system of claim 19, wherein the model represents the generation of the sequence of query events in a plurality of sessions by a hierarchical Dirichlet process or by a hierarchical Pitman-Yor process.

* * * * *